UNITED STATES PATENT OFFICE.

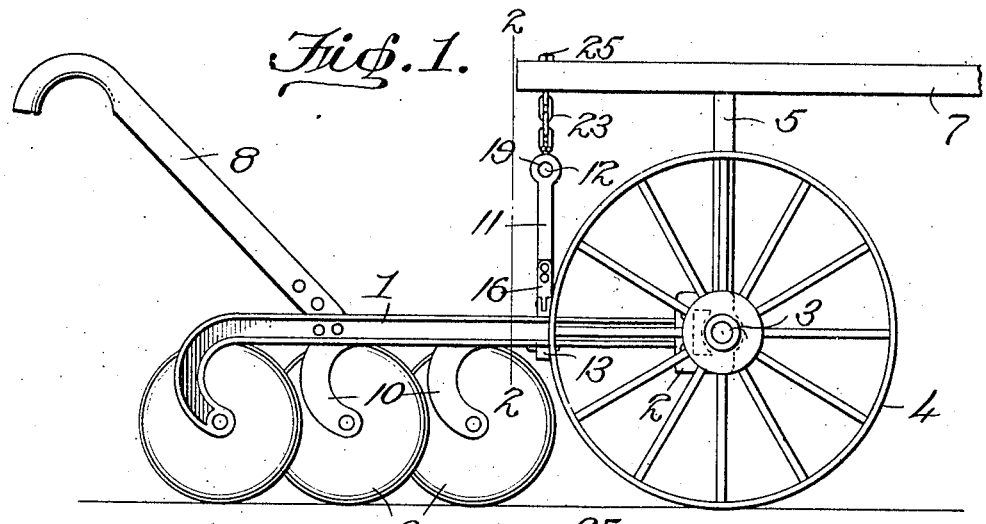
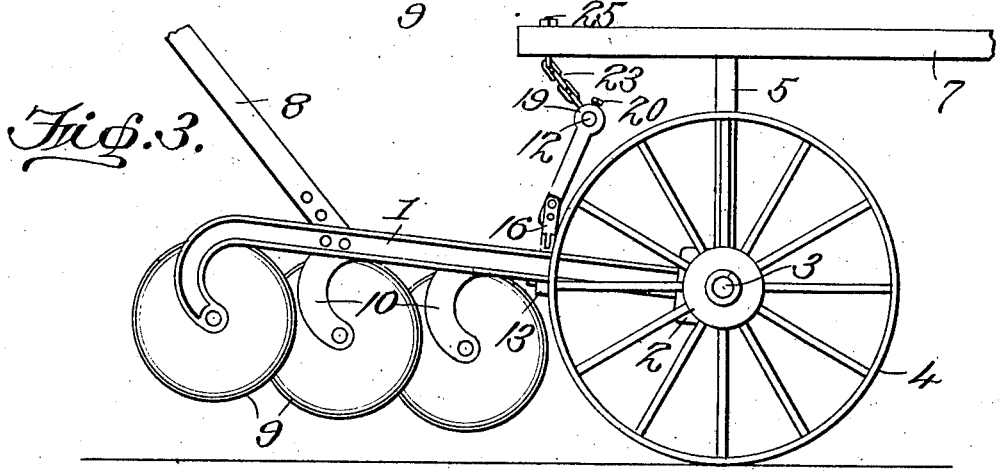
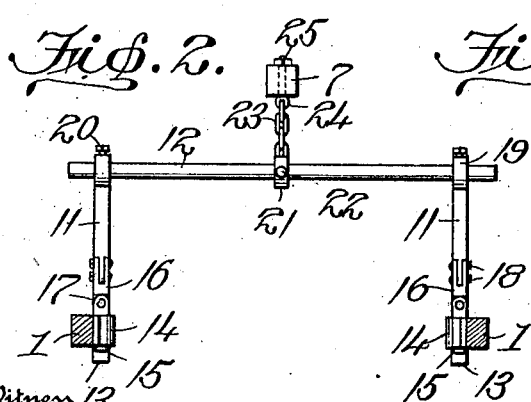
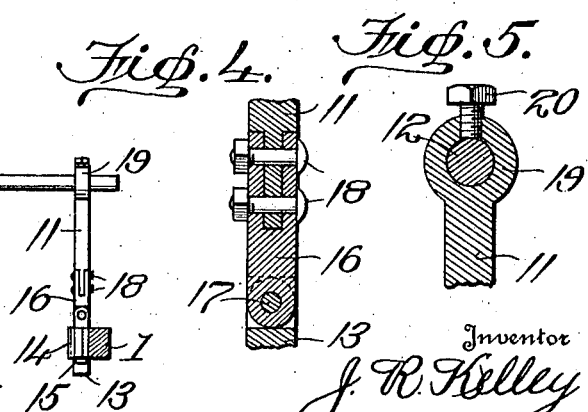

UNITED STATES PATENT OFFICE.

JOEL R. KELLEY, OF OWASSO, OKLAHOMA.

CULTIVATOR-ARCH.

1,241,634.  Specification of Letters Patent.  Patented Oct. 2, 1917.

Application filed January 15, 1917. Serial No. 142,489.

*To all whom it may concern:*

Be it known that I, JOEL R. KELLEY, a citizen of the United States, residing at Owasso, in the county of Tulsa, State of Oklahoma, have invented certain new and useful Improvements in Cultivator-Arches; and I do hereby declare the following to be a full, clear, and exact description of the invention, such as will enable others skilled in the art to which it appertains to make and use the same.

This invention relates to improvements in cultivators.

The object of my invention is to provide an improved form of frame for use for walking cultivators in which cultivator disks are sometimes substituted for the usual shovel cultivator tools. More particularly, my invention contemplates an arch construction for use in connection with the beams of walking cultivators whereby spreading of the latter or side drag of the cultivator will be prevented by the action of disk cultivator tools when the latter are substituted for the usual shovel tools. In the construction of such an arch provision is made for the proper support of the arch from the tongue or draft device, the relationship being such that the arch may be collapsed when the cultivator beams are elevated to throw the arch upwardly into the locality of the rear end of the tongue.

With the above objects in view and such others as may hereinafter appear, my invention will now be fully set forth and described, reference being had to the accompanying drawings.

In the drawings.

Figure 1 is a side elevation of a walking cultivator, partly broken away showing my improved construction, Fig. 2 is a section on line 2—2 of Fig. 1, Fig. 3 is a view similar to Fig. 1 showing the cultivator beams in elevated position, Fig. 4 is an enlarged detail of one of the arch connections, and Fig. 5 is a further detail.

Referring more particularly to the drawings, 1 represents the beams of a cultivator of the walking type whose forward ends are mounted in the brackets 2 carried by the cultivator axles 3, the latter being supported by the usual wheels 4. Upon a frame 5 rising from the axles 4 is supported the rear portion of a tongue 7, so that a draft team fixed to the tongue may draw the cultivator beams 1 upon opposite sides of a row. Handles 8 for the operator are provided, so that the cultivator beams may be suitably guided in the direction of the disks 9 which are carried by the gangs 10.

Rising from the beams 1, preferably in front of the gangs 10 is an arch member which consists generally of the standards 11, and the cross bar 12. The standards 11 rise from the swivel pins 13 whose spindles project through the vertical bearing brackets 14 secured to the inner faces of the beams 1 and are therein secured by means of the cotter pins or other securing devices 15. The upper ends of the swivel pins 13 are transversely bifurcated to receive the lower end of the knuckles 16, the pins 17 being provided to secure the knuckles 16 within the upper ends of the pins 13. In turn, the upper ends of the knuckles 16 are bifurcated, but longitudinally of the cultivator, and receive between the arms of the bifurcations, the lower ends of the standards 11, the latter being normally held in a rigid axial relation to the knuckles 16 by means of the pairs of pins or bolts 18. The upper ends of the standards 11 are provided with the transverse sockets 19 through which is extended the transverse bar 12 in fitted relation, and may be therein adjustably clamped by means of the set screws or other fastening devices 20. Midway between the standards 11, the cross bar 12 is provided with a slidably adjustable collar 21 which may be fixed to the cross bar by means of a set screw 22. The collar 21 provides an attachment for a chain or other flexible coupling element 23 whose upper end is secured to the eye 24 of a bolt 25 which is passed through the rear extremity of the tongue 7.

In its use, the cultivator which is built in accordance with the above described construction may be used with equal efficiency and satisfaction either as a disk or shovel cultivator, the arch member described preventing side drafts or undue spreading of the beams due to the action of the inclined disks. When the beams 1 are in their lowered or inoperative position, the arch and consequently the beams are suspended from the rear end of the cultivator tongue by means of the chain 23, so that the disks do not cut into the ground too deeply. The rigidity of the standards is maintained by the use of the pairs of bolts 18, but when the beams 1 are elevated so as to throw the disks into operative position, it is desirable to collapse the arch so that it will not interfere with the rear end of the tongue and for this purpose one of the pins 18 from each side may be withdrawn so as to permit the other pins to act as pivots, so that the arch may swing forwardly as the beams are elevated as shown in Fig. 3.

From the foregoing, it will be evident that I have provided an improved frame structure for walking cultivators, and that while the usual use of the shovel cultivator tools is not interfered with, the machine possesses this added advantage of the interchangeable use of cultivator disks on a walking cultivator.

What I claim as my invention is:—

1. The combination with the supporting gear, tongue and beams of a walking cultivator, of an arch spanning the beams and having a flexible connection with the tongue, whereby the beams are adjustably suspended from the latter, but may be freely lifted.

2. The combination with the supporting gear, tongue and beams of a walking cultivator, of an arch spanning the beams and having a flexible connection with the tongue, said arch consisting of standards pivotally mounted on the beams and a connecting bar rigidly spacing said standards, whereby the arch may fall below the tongue when the beams are raised.

In testimony whereof, I affix my signature, in the presence of two witnesses.

JOEL R. KELLEY.

Witnesses:
ELMER SMITH,
CARRIE GEORGE.

Copies of this patent may be obtained for five cents each, by addressing the "Commissioner of Patents, Washington, D. C."